United States Patent
Porikli et al.

(10) Patent No.: US 8,140,450 B2
(45) Date of Patent: Mar. 20, 2012

(54) ACTIVE LEARNING METHOD FOR MULTI-CLASS CLASSIFIERS

(75) Inventors: Fatih M. Porikli, Watertown, MA (US); Ajay Joshi, Minneapolis, MN (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 544 days.

(21) Appl. No.: 12/413,492

(22) Filed: Mar. 27, 2009

(65) Prior Publication Data
US 2010/0250473 A1  Sep. 30, 2010

(51) Int. Cl.
*G06F 15/18* (2006.01)
(52) U.S. Cl. .................................................. 706/12
(58) Field of Classification Search ............. 706/12
See application file for complete search history.

(56) References Cited

U.S. PATENT DOCUMENTS

| | | | |
|---|---|---|---|
| 7,648,460 B2 * | 1/2010 | Simopoulos et al. | 600/437 |
| 7,742,641 B2 * | 6/2010 | Ivanov et al. | 382/224 |
| 7,840,059 B2 * | 11/2010 | Winn et al. | 382/155 |
| 7,941,382 B2 * | 5/2011 | Stokes et al. | 706/20 |

OTHER PUBLICATIONS

Employing EM and Pool-Based Active Learning for Text Classification, Andrew Kachites McCallum; Kamal Nigam, 1998.*
Support Vector Machine Active Learning with Applications to Text Classification, Simon Tong; Daphne Koller; 1998.*
Holub et al., "Entropy-Based Active Learning for Object Recognition," CVPR, Workshop on Online Learning for Classification, 2008.

* cited by examiner

*Primary Examiner* — Michael B Holmes
(74) *Attorney, Agent, or Firm* — Dirk Brinkman; Gene Vinokur

(57) ABSTRACT

A method trains a multi-class classifier by iteratively performing the following steps until a termination condition is reached. The probabilities of class membership for unlabeled data obtained from an active pool of unlabeled data are estimated. A difference between a largest probability and a second largest probability is determined. The unlabeled data with the lowest difference is selected, labeled and then added to a training data set for training the classifier.

20 Claims, 3 Drawing Sheets

ACTIVE LEARNING METHOD FOR MULTI-CLASS CLASSIFIERS

FIELD OF THE INVENTION

This invention relates to training multi-class classifiers, and more particularly to using active learning to train the classifiers.

BACKGROUND OF THE INVENTION

Most methods for classifying objects, such as objects in images, use statistical models that are trained using labeled training data. Typically, a passive learning method accepts randomly selected training data. However, providing and labeling a large labeled training data set is time consuming, while a small labeled training data set reduces the accuracy of the classification.

In active learning, the method selects "useful" data for a user to label, instead of passively accepting randomly selected data. Active learning can significantly reduce the amount of training data required, compared to passive learning while achieving similar classification accuracy as passive learning.

The principal idea in active learning is that not all data are of equal value to the classifier, especially for classifiers that have sparse solutions. For example, with a support vector machine (SVM) classifier, the classification is the same when all training data except the support vectors of a separating hyperplane are omitted. Thus, the support vectors define the hyperplane, and all other data are redundant.

One active learning method is for an SVM in a relevance feedback framework for image retrieval. That method relies on margins for unlabeled examples and works only for a binary class classifier.

Another active learning method minimizes a version space at each iteration. The version space is a subset including all hypotheses that are consistent with the training data. However, that method is also not easily extensible to the multi-class case.

Another method uses Gaussian processes for active learning. That method relies on uncertainty estimates of the examples, obtained through Gaussian process regression, which is computationally expensive (O(N3), and cubic in the number of training examples. That method handles multi-class classification using a one-verses-all SVM formulation. To incorporate multi-class problems, that method adds one example per classifier at each round, because their active learning method is primarily targeted towards binary classification.

Another method for active learning in the multi-class setting finds examples that minimize the expected entropy of the system after the addition of random examples from the active pool, see Holub et al., "Entropy-based active learning for object recognition," CVPR, Workshop on Online Learning for Classification, 2008. In essence, the method is an information-based approach because that method attempts to gain most information about the unknown labels in order to minimize entropy. That is extremely intensive computationally. The method is time cubic in both the number of unlabeled images N and the number of classes k, i.e., $O(k^3N_3)$.

Active learning in batch mode with SVMs has been described for the task of image retrieval. That method explicitly handles the selection of multiple images at every iteration through an optimization framework. Because that method is targeted towards image retrieval, the primary classification task is binary; to determine whether an image belongs to the class of the query image.

A confidence based active learning method uses a conditional error as a metric of uncertainty of each example. However, that method only focuses only on the binary classification problem.

SUMMARY OF THE INVENTION

Training conventional classifiers requires a large amount of labeled training data. Preparing this training data is time consuming. The embodiments of the invention provide an active learning method. Instead of passively accepting random training data, the active learning method iteratively selects unlabeled data for a user to label, so that the effort is focused on labeling the most useful data.

The method uses uncertainty sampling, wherein only unlabeled data that are hardest to classify are selected. Unlike most conventional methods, the present method is computationally efficient and can easily handle a large number of classes.

The method does not require prior knowledge of the number of classes. The method selects training data based on estimating an probability of correctly classifying the training data. The method can be extremely important in real-world problems, where the number of classes might not be known beforehand. Therefore, the number of classes can increase with time, because the method does not rely on the number of classes. The method reduces the number of training data required over random selection, and achieves similar classification accuracy.

DETAILED DESCRIPTION OF THE PREFERRED EMBODIMENT

Pool-Based Learning

Figure 1:
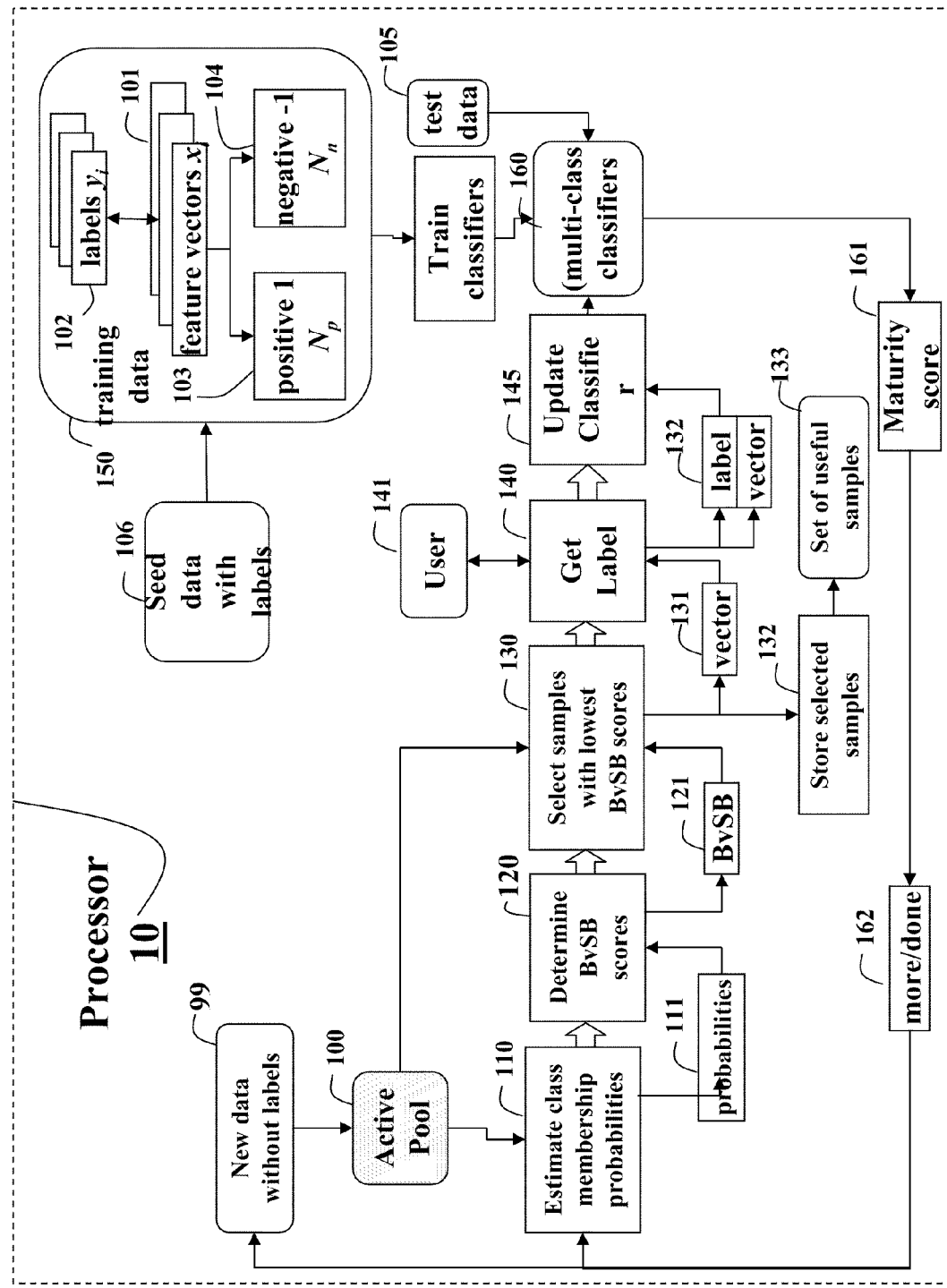
FIG. 1 is a flow diagram of a method for training a multi-class classifier.

FIG. 1 shows the general method according to embodiments of the invention. The steps of the method are performed in a processor 10 with suitable memory. Pool-based learning is common in active learning. A classifier 150 is trained using a small randomly selected labeled data set, called a seed data set 106. Two samples are sufficient. Then, the active learning method selects useful data 133 to label from an active pool 100 unlabeled data. New data 99 can be added to the pool as needed. We use the term 'useful' to refer to data that improve classification accuracy of the classifier. The accuracy of the classifier is of primary importance.

The actively selected data, with user-provided labels are then added to the training data. This process is iterative 162, such that, after each iteration of user feedback, the classifier is retrained. Finally, performance evaluation is done using a test data set 105 to produce a maturity score 161. The test data set is different from the seed set and the active pool. The number of rounds of active learning is k, and the number of test examples selected for each iteration is n.

Support Vector Machines as the Primary Classifier.

We use a support vector machine (SVM) is the primary classifier 160. In conventional SVM classifiers the number of classes is typically know before hand. The SVM is a supervised learning method for classification and regression. For example, a conventional SVM two-class classifier constructs a hyperplane that separates two data sets into the two classes. The plane maximizes a margin between the two data sets.

Multi-Class Active Learning

Our approach uses uncertainty sampling, wherein data, which the classifier is uncertain about, are selected for labeling by the user 141. The distance from the hyperplane for margin-based classifiers has been used as a measure of uncertainty. However, that uncertainty sampling does not easily extend to multi-class classification due to the requirements for multiple hyperplanes.

We use a notion of uncertainty that is easily applicable to a large number of classes. The uncertainty is obtained from class membership probability values for the unlabeled data, as output by the multi-class classifier.

In the case of a probabilistic model, the values are directly available. For other classifiers, such as the SVM, we first estimate 110 class membership probabilities 111 of the unlabeled data. Below, we describe estimating the probability values for multi-class SVM. However, our estimating of probabilities can also be used with other discriminative multi-class classifiers.

Probability Estimation

Our uncertainty sampling method relies on estimates of the probabilities 111 of class membership for all the unlabeled data 100. The class probability is estimated using a sigmoid function, e.g., which generally can be expressed as $p(x)=1/(1+e^{-x})$. In order to obtain these estimates, we use the following procedure to obtain probabilistic outputs from the SVM.

As shown in FIG. 1, our training data 150 set is in a form of feature vectors $x_i$ 101 with corresponding labels $y_i$ 102, either negative (−1) or positive (1). A decision function of the SVM is $f(x)$. The function can be used to determine the prediction by thresholding. The conditional probability of class membership $P(y=1|x)$ can be estimated using $$p(x) = \frac{1}{1+\exp(Af(x)+B)}, \quad (1)$$

where A and B are parameters to be estimated. Regularized maximum likelihood estimation is used to solve for the parameters as $$\max_{(A,B)} \left[ \sum_{i=1}^{l} (t_i \log(p_i) + (1-t_i)\log(p_i)) \right] \quad (2)$$

where l is the number of feature vectors for the samples in the active pool, min is a function that selects a smallest value, and t is a parameter for each sample to adjust the importance of the positive and negative labeled examples defined as $$p_i = \frac{1}{1+\exp(Af(x_i)+B)},$$

$$t_i = \begin{cases} \frac{N_p+1}{N_p+2} & \text{if } y_i = 1; \\ \frac{1}{N_n+2} & \text{if } y_i = -1. \end{cases}$$

$N_p$ and $N_n$ are positive 103 and negative 104 samples in the training data set, respectively. Newton's gradient descent method, with a backtracking line search, can be used to solve the above optimization problem to obtain the probability estimates.

We use a pair-wise comparison SVM classifier 160, wherein the classifier is trained for each possible pair of k classes, so that the SVM classifier is suitable for multi-class classification. The pair-wise SVM is computationally efficient and accurate.

Probability 111 for the multi-class case can be estimated 110 through such pair-wise coupling. In order to estimate the probabilities, we first need binary probability estimates, which can be obtained as described above. Assume that $r_{ij}$ are the binary probability estimates of $P(y=i|y=i, \text{ or } j, x)$.

In the multi-class case, we denote the probabilities 111 for class i to be $p_i$. Using the pair-wise coupling, the problem becomes $$\min_{P} \frac{1}{2} \sum_{i=1}^{k} \sum_{j:j\neq i} (r_{ji}p_i - r_{ij}p_j)^2, \quad (3)$$

$$\text{subject to } \sum_{i=1}^{k} p_i = 1, p_i \geq 0, \forall i,$$

where k denotes the number of classes. The above optimization problem can be solved using a simple iterative method.

In the following, we describe to embodiments for uncertainty sampling based active learning using class membership probability estimates.

Entropy Measure (EP)

Each labeled training data 101-102 belongs to a certain class denoted by $y \in \{1, \ldots, k\}$, where k is not known prior to training. However, we do not know true class labels for data in an active pool. For each unlabeled data, we can consider the class membership variable to be a random variable denoted by Y.

We have a distribution p for Y of estimated class membership probabilities 111 determined as described above. Entropy is a measure of uncertainty of a random variable, e.g., a large entropy means a low probability. Because we are looking for measures that indicate uncertainty in class membership Y; the discrete entropy of the class is a natural choice. The discrete entropy of Y is estimated by $$H(Y) = -\sum_{i=1}^{k} p_i \log(p_i). \quad (4)$$

Larger values of entropy imply more uncertainty the distribution, e.g., lower probability. This can be used as an indicator of uncertainty of an example. If an example has a distribution with large entropy, the classifier is uncertain about its class membership.

Our method should not be confused with the entropy based method of Holub. Our method can be classified as an "uncertainty sampling" approach. That method is an information-based approach. We do not try to gain most information. We simply select the "most uncertain" test data, according to our notion of uncertainty. Our method and Holub are conceptually very different, and easily distinguished. Moreover, Holub et al. need time cubic, in both the number of unlabeled images and the number of classes. This makes the method impractical for a large number of classes and samples Our method demonstrates empirical linear time dependence on the number of unlabeled data in the active pool, over a large range of classes, e.g., <100, and a large number of samples greater than 6000, see FIG. 3.

General Method

FIG. 1 shows our method. At each iteration 162 of active learning, we estimate 110 class membership probabilities 111 for all data (vectors) in the active pool 100. Data 132 with a largest estimated value of discrete entropy or uncertainty 111, i.e., lowest probability, are selected 130 to be labeled 140 by the user 141. After user labels 132 are obtained, the corresponding labeled training data are used to update and train 145 the classifier 160.

The test data 105 can be used to measure a maturity score 161 (accuracy) of the classifier, and terminate 162 the training when the maturity score exceeds a predetermined threshold.

Best-Versus-Second Best (BVSB)

Figure 2A:
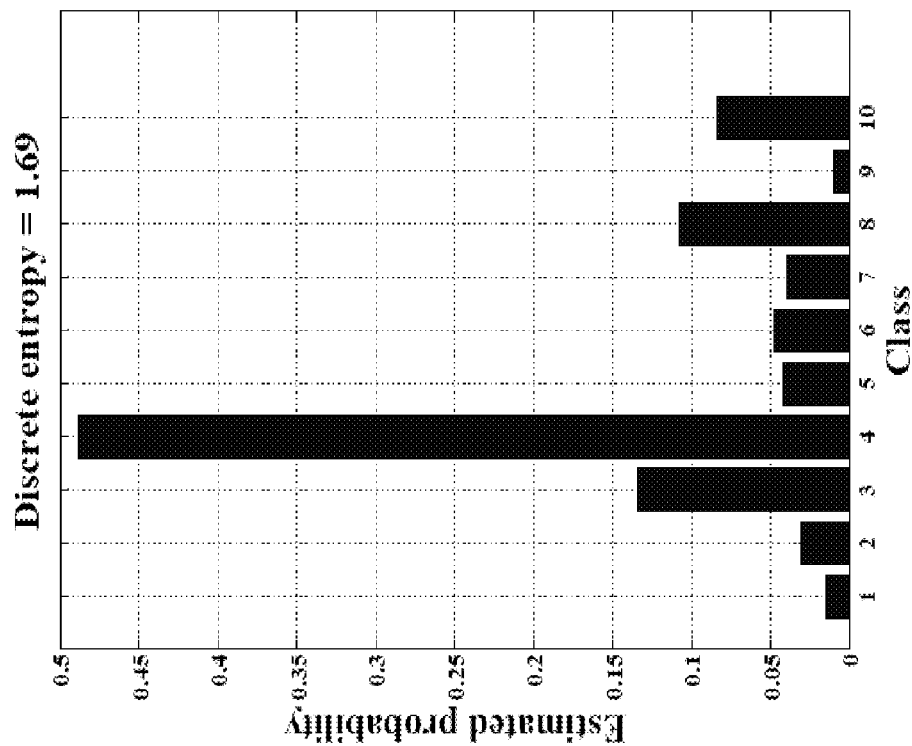
FIG. 2A-2B are graphs of estimated probability distributions for two unlabeled examples in a ten class problem.
Figure 2B:
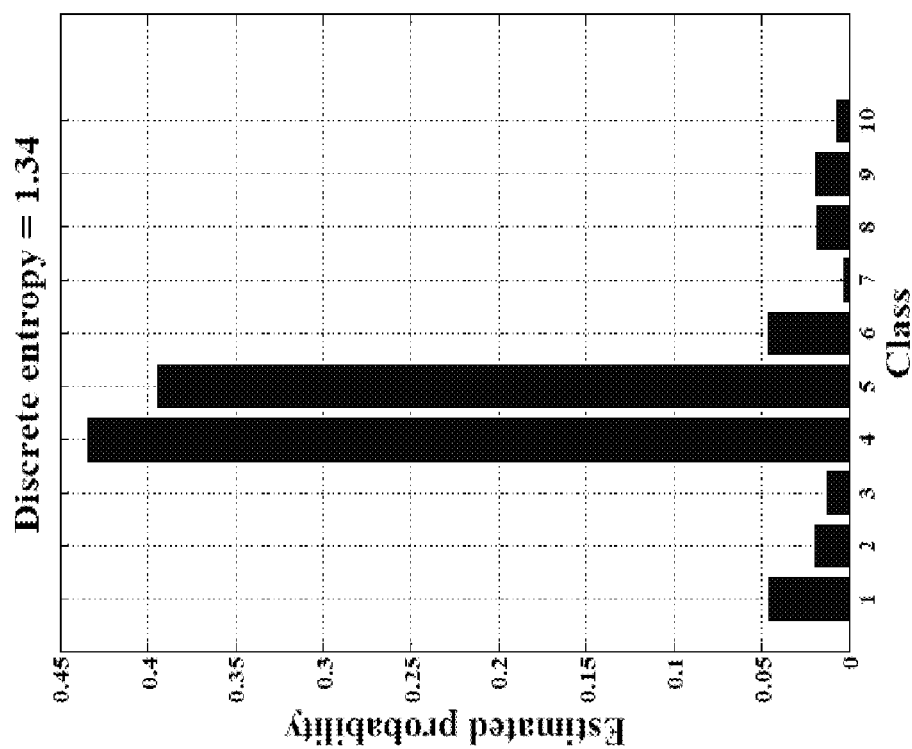

As shown in FIG. 2A-2B, even though entropy-based active learning is often better than random selection, it has disadvantages. A problem of the entropy measure is that its value is heavily influenced by probability values of unimportant classes.

The plots show estimated probability distributions for two unlabeled examples in a ten class problem. The plot in FIG. 2A shows that the classifier is very confused between classes 4 and 5, and assigns similar probabilities to the two classes. In FIG. 2B, the classifier is relatively more confident that the example belongs to class 4. Therefore, the entropy measure assigns larger uncertainty to example due to the influence of probability values of unimportant classes, i.e., classes that the example is unlikely to belong to. Purely in terms of a classification decision, the classifier is more confused about example in FIG. 2A.

Uncertainty

This problem becomes even more acute when there are a large number of classes. Although entropy is a true indicator of uncertainty of a random variable, we are interested in a more specific type of uncertainty relating only to classification amongst the most confused classes, i.e., the data are virtually guaranteed to not belong to classes having a small probability estimate.

Instead of relying directly on the probability 111, we take a more greedy approach to account for the above problem. We determine 120 a difference 121 between the probability values of the two classes having the largest estimated probability value as our measure of probability 111. Because it is a comparison of the best (largest) probability) and the second best (largest) probability, we call this the best-versus-second-best (BVSB) approach. The BvSB 121 measure is a more accurate way of estimating confusion about class membership from a classification standpoint.

As described above, confidence estimates are reliable in the sense that classes assigned low probabilities are very rarely the true classes of the data. However, this is only true if the initial training data set size is large enough for good probability estimation. We can start with a seed data 106 that has as few as two examples for training in a hundred-class classifier 160.

Estimated Probability

Initially, the probability estimates 111 are not very reliable, and random example selection gives similar results. As the amount of training data 150 increases, active learning using the BvSB 121 quickly becomes better than random selection, by a significant margin. Most methods that do not use margins rely on some kind of model on the data. Therefore, probability estimation with a small data set presents a problem for most active learning methods.

Termination Criteria

The training is done batch by batch for each new set of data. At each training cycle, we evaluate the performance. This is achieved by using a test dataset, or using a validation dataset of samples with known or unknown labels. In case we know the labels in the test and validations data, we measure the accuracy of the classifier. The accuracy is the ratio of the correctly labeled samples to all test or validation samples. We assign the ratio as the maturity score. When the maturity score reaches a threshold we stop training. If the accuracy meets the target performance goals, we stop training. Otherwise, we keep retraining the classifiers until we reach the performance goals.

In case there is no separate testing or validation data provided, we observe the response of the classifier on the active pool data. We compute the ratio of the number of newly discovered classes over a fixed number of most recent training cycles, for instance last ten training cycles. In other words, we observe the class discovering behavior of the multi-class classifiers. If the training cycles do not significantly change the number of current classes in the classifier, we consider the classifier become mature and the training can be terminated. We assign the inverse of the ratio as the maturity score.

Alternatively, we observe the fitness of the classifiers by computing an average score of the lowest difference scores. This is done over a fixed number of most recent training cycles. Then, we assign the average score as the maturity score.

Our method also generates a set of the most useful training sample. We include the initial seed samples and the samples selected in the training cycles in this set of useful samples. This set represents an optimum set of training samples for each class, and for the set of multiple classes. It is possible to use this set to train other multi-class classifiers more effectively.

Computational Cost

There are two aspects to the cost of active selection. First, the cost of training the SVM on the training set, at each iteration. Second, the probability estimation on the active pool, and selecting examples with the largest BvSB score.

SVM training is by far the most computationally intensive component of the entire process. However, the essence of active learning is to minimize a size of the training data set by intelligent data selection. Therefore, it is more important to consider the cost of probability estimation and example selection on the relatively much larger active pool of training data. The first cost comes from probability estimation in binary SVM classifiers. The estimation is efficient because it is performed using Newton's method with backtracking line search that guarantees a quadratic rate of convergence.

Figure 3:
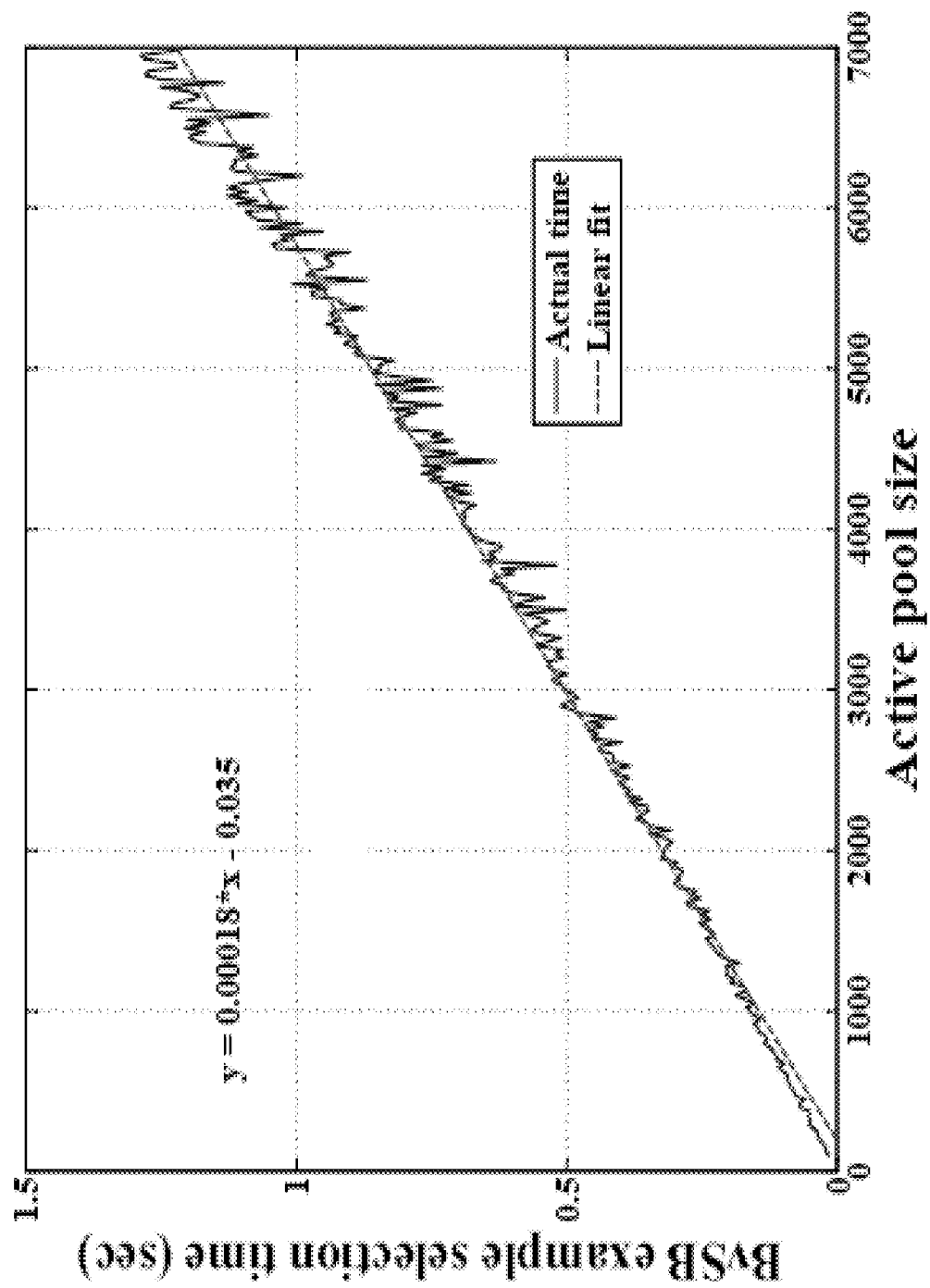
FIG. 3 is a graph of selection time as function of classes according to embodiments of the invention.

As shown in FIG. 3, the selection time as a function of active pool size. The relationship is linear. This demonstrates that the method is scalable to large active pool sizes that are common in real applications.

EFFECT OF THE INVENTION

The embodiments of the invention provide an active learning method for multi-class classification. The method does not require knowledge of the total number of classes. The method is efficient with large number of classes and large data sizes.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for training a multi-class classifier, comprising a processor for performing steps of the method iteratively until a termination condition is reached, comprising the steps of:
   estimating probabilities of class membership for unlabeled data obtained from an active pool of unlabeled data;
   determining a difference between a largest probability and a second largest probability;
   selecting the unlabeled data with the lowest difference;
   labeling the selected unlabeled data;
   adding the labeled data to a training data set; and
   training the classifier with the training data set.

2. The method of claim 1, wherein the classifier is trained with a seed set of labeled data.

3. The method of claim 2, wherein the seed set includes two samples of the labeled data.

4. The method of claim 1, further comprising:
   evaluating, after the training, a performance of the classifier with a test data set to determine whether the termination condition is satisfied.

5. The method of claim 1, wherein the multi-class classifier uses a support vector machine.

6. The method of claim 1, wherein a number of the classes is unknown.

7. The method of claim 1, wherein the estimating uses a sigmoid function.

8. The method of claim 1, wherein the probability of a sample x is $$p(x) = \frac{1}{1 + \exp(Af(x) + B)},$$

where $f(x)$ is a decision function, A and B are parameters to be estimated.

9. The method of claim 8, estimating the parameters using maximum likelihood estimation is used to solve for the parameters according to $$\max_{(A,B)} \left[ \sum_{i=1}^{l} (t_i \log(p_i) + (1 - t_i) \log(p_i)) \right]$$

where l is the number of samples in the active pool, and t is a parameter for each sample to adjust the importance of the positive and negative labeled examples, min is a function that selects a smallest value, i is a number of samples in the training data set, and $$p_i = \frac{1}{1 + \exp(Af(x_i) + B)},$$

$$t_i = \begin{cases} \frac{N_p + 1}{N_p + 2} & \text{if } y_i = 1 \\ \frac{1}{N_n + 2} & \text{if } y_i = -1 \end{cases}, \text{ and}$$

$N_p$ and $N_n$ are positive 103 and negative 104 samples in the training data set, respectively.

10. The method of claim 9, wherein the maximum likelihood is determined using Newton's gradient method and a backtracking line search.

11. The method of claim 5, wherein comparisons by the support vector machine is pair-wise.

12. The method of claim 8, wherein a number of the classes is k and a number samples in the training data set is l, and a discrete entropy of a class membership Y is $$H(Y) = -\sum_{i=1}^{k} p_i \log(p_i).$$

13. The method of claim 6, wherein a number of the classes is greater than one hundred, and a number of samples in the training data set is greater than sic thousand.

14. The method of claim 1, further comprising:
   evaluating, after the training, a performance of the classifier with a validation data set to determine whether the termination condition is satisfied.

15. The method of claim 1, further comprising:
   evaluating a maturity score to as the termination condition.

16. The method of claim 15, further comprising:
   determining a ratio of the number of newly discovered classes over a fixed number of most recent training cycles; and
   assigning the inverse of the ratio as the maturity score.

17. The method of claim 15, further comprising:
   determining an average score of the lowest difference over a fixed number of most recent training cycles; and
   assigning the average score as the maturity score.

18. The method of claim 14, further comprising:
   applying the trained classifier to the validation or test data,
   computing a ratio of correctly classified samples using labels;
   assigning the ratio of correctly classified samples as a maturity score; and
   evaluating the maturity score to as the termination condition.

19. The method of claim 1, further comprising:
   initializing the training data with labeled seed data.

20. The method of claim 19, where in the seed data set includes two labeled samples.

* * * * *